US010002278B2

United States Patent
Song et al.

(10) Patent No.: US 10,002,278 B2
(45) Date of Patent: *Jun. 19, 2018

(54) SENSOR SCREEN AND DISPLAY DEVICE INCLUDING THE SAME

(71) Applicant: LG DISPLAY CO., LTD., Seoul (KR)

(72) Inventors: Moonbong Song, Seoul (KR); Kyoseop Choo, Suwon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 66 days.

This patent is subject to a terminal disclaimer.

(21) Appl. No.: 15/014,551

(22) Filed: Feb. 3, 2016

(65) Prior Publication Data

US 2016/0224818 A1 Aug. 4, 2016

(30) Foreign Application Priority Data

Feb. 4, 2015 (KR) .................. 10-2015-0017306

(51) Int. Cl.
G06K 9/00 (2006.01)
G06F 3/044 (2006.01)
G06F 1/16 (2006.01)
G06F 21/32 (2013.01)
H05K 1/11 (2006.01)
H05K 1/18 (2006.01)

(52) U.S. Cl.
CPC ......... G06K 9/0002 (2013.01); G06F 1/1637 (2013.01); G06F 1/1684 (2013.01); G06F 3/044 (2013.01); G06F 21/32 (2013.01); H05K 1/118 (2013.01); H05K 1/189 (2013.01); H05K 2201/10128 (2013.01); H05K 2201/10151 (2013.01)

(58) Field of Classification Search
CPC .. G06K 9/0002; G06K 9/00006; G06F 3/044; G06F 1/16; G06F 1/1684; G06F 21/32; H05K 1/0281; H05K 1/0296; H05K 1/189; H05K 2201/10151
USPC .......................................... 382/124
See application file for complete search history.

(56) References Cited

U.S. PATENT DOCUMENTS 9,207,720 B2 * 12/2015 Kang .................... G06F 1/1643
9,396,379 B2 * 7/2016 Slogedal .............. G06K 9/0002
(Continued)

FOREIGN PATENT DOCUMENTS

KR 10-2012-0138886 A 12/2012
KR 10-2014-0046888 A 4/2014
KR 10-1473184 B1 12/2014

*Primary Examiner* — Daniel Mariam
(74) *Attorney, Agent, or Firm* — Birch, Stewart, Kolasch & Birch, LLP

(57) ABSTRACT

A sensor screen and a display device including the same are discussed. The sensor screen can include a first base member including a first active area and a first bezel area and having a first thickness, a second base member positioned opposite the first base member and having a second thickness less than the first thickness; and a fingerprint sensor disposed on one of the first and second base members which are positioned opposite each other. The fingerprint sensor can include a first group of fingerprint electrodes, which are arranged in a first direction in a portion of the first active area, and a second group of fingerprint electrodes, which are insulated from the first group of fingerprint electrodes and are arranged in a second direction crossing the first direction.

14 Claims, 9 Drawing Sheets

(56) References Cited

U.S. PATENT DOCUMENTS

| | | | |
|---|---|---|---|
| 2009/0225045 A1* | 9/2009 | Liu | G06F 3/0412 |
| | | | 345/173 |
| 2013/0307818 A1 | 11/2013 | Pope et al. | |
| 2015/0177884 A1* | 6/2015 | Han | G06F 3/044 |
| | | | 345/174 |
| 2015/0227170 A1* | 8/2015 | Kim | G06F 1/1643 |
| | | | 345/174 |
| 2016/0180145 A1* | 6/2016 | Setterberg | G06K 9/00026 |
| | | | 382/124 |

* cited by examiner

SENSOR SCREEN AND DISPLAY DEVICE INCLUDING THE SAME

This application claims the priority benefit of Korean Patent Application No. 10-2015-0017306 filed on Feb. 4, 2015, which is incorporated herein by reference for all purposes as if fully set forth herein.

BACKGROUND OF THE INVENTION

Field of the Invention

The present disclosure relates to a sensor screen and a display device including the same, and more particularly to a sensor screen having a fingerprint recognition function and a display device including the same.

Discussion of the Related Art

With the development of computer technology, computer based systems applied to various utilities, such as notebook computers, tablet personal computers (PCs), smart phones, personal digital assistants (PDAs), automated teller machines (ATMs), and information systems have been developed. In general, the computer based systems store various data including secret information such as business information and business secret as well as personal information related to private affairs. Thus, it is required to strengthen security to protect the secret information.

To this end, fingerprint sensors have been developed to strengthen security by performing registration or certification of systems using fingerprints of human beings.

The fingerprint sensor is a sensor capable of sensing fingerprints of human beings. The fingerprint sensor is classified into an optical fingerprint sensor and a capacitive fingerprint sensor.

The optical fingerprint sensor utilizes a principle in which a light source, such as a light emitting diode (LED), emits light and senses the light reflected from ridges and valleys of a fingerprint through a CMOS image sensor. There are, however, some problems such as an increase in size due to the use of LEDs and a rise in product cost due to the use of expensive light source.

The capacitive fingerprint sensor utilizes a difference of electric charges charged between ridges and valley of the finger contacted thereto.

U.S. Patent Publication No. 2013/0307818 published on Nov. 21, 2013, and entitled "Capacitive Sensor Package" describes a related art capacitive fingerprint sensor.

The published capacitive fingerprint sensor is configured as an assembly form coupled with a particular push button. The capacitive fingerprint sensor includes a silicon wafer, on which a circuit for measuring a capacitance between the fingerprint (ridges and valleys) and a capacitive plate is printed.

In general, it is necessary for the capacitive fingerprint sensor described in US Patent Publication No. 2013/0307818 to have a high resolution sensor array and an integrated circuit (IC) for the fingerprint recognition processing because the finger's ridges and valleys have a very minute size of about 300 μm to about 500 μm. To this end, the capacitive fingerprint sensor utilizes the silicon wafer for integrating the IC with the sensor array.

However, in case of integrating the IC with the high resolution sensor array using the silicon wafer, it is necessary for the capacitive fingerprint sensor to have an assembly construction for coupling the fingerprint sensor with a push button. Accordingly, there are some problems such as a complicated construction and an increase in a non-display area (e.g., bezel area) in the optical fingerprint sensor due to the assembly construction. Also, there are other problems including the issue where the thickness is increased and an area for sensing the fingerprint depends on the size of the push button (e.g., a home key of a smart phone) because the push button overlaps the fingerprint sensor.

SUMMARY OF THE INVENTION

The present disclosure provides a sensor screen and a display device including the same capable of addressing problems and limitations associated with the related art capacitive fingerprint sensors.

In one aspect of the invention, there is provided a sensor screen comprising a first base member including a first active area and a first bezel area, and having a first thickness; a second base member positioned opposite the first base member, the second base member having a second thickness less than the first thickness; and a fingerprint sensor disposed on one of the first and second base members which are positioned opposite each other, the fingerprint sensor including a first group of fingerprint electrodes, which are arranged in a first direction in a portion of the first active area, and a second group of fingerprint electrodes, which are insulated from the first group of fingerprint electrodes and are arranged in a second direction crossing the first direction.

The sensor screen may further comprise a flexible printed circuit board on which a fingerprint integrated circuit (IC) is mounted, the fingerprint IC being configured to supply a driving pulse to one group of the first and second group of fingerprint electrodes and sense a voltage difference resulting from a touch operation through another group of the first and second group of fingerprint electrodes.

The fingerprint sensor may be entirely disposed in a portion having a predetermined width in the first active area. The flexible printed circuit board may be a single flexible printed circuit board on which a plurality of fingerprint ICs are mounted. The first group of fingerprint electrodes may be commonly connected to each of the plurality of fingerprint ICs through first wires. The second group of fingerprint electrodes are divided into sub-groups same to a number of the plurality of fingerprint ICs, and the sub-groups of fingerprint electrodes are respectively connected to the plurality of fingerprint ICs through second wires.

The fingerprint sensor may be entirely disposed in a portion having a predetermined width in the first active area. The flexible printed circuit board may be a single flexible printed circuit board on which a single fingerprint IC is mounted. The first group of fingerprint electrodes may be connected to the single fingerprint IC through first wires. The second group of fingerprint electrodes may be connected to the single fingerprint IC through jumping wires, each of which connects a predetermined number of second wires among second wires respectively connected to the second group of fingerprint electrodes.

The fingerprint sensor may be entirely disposed in a portion having a predetermined width in the first active area. The flexible printed circuit board may include a first flexible printed circuit board on which first fingerprint IC is mounted and a second flexible printed circuit board on which a plurality of second fingerprint ICs are mounted. The first group of fingerprint electrodes are connected to the first fingerprint IC through first wires, and wherein the second group of fingerprint electrodes are divided into sub-groups same to a number of the plurality of second fingerprint ICs, and the sub-groups of fingerprint electrodes are respectively connected to the plurality of second fingerprint ICs The fingerprint sensor may be entirely disposed in a portion having a predetermined width in the first active area, wherein the flexible printed circuit board includes a first flexible printed circuit board on which a first fingerprint IC is mounted and a second flexible printed circuit board on which a second fingerprint IC is mounted. The first group of fingerprint electrodes are connected to the fingerprint IC through first wires, and the second group of fingerprint electrodes are connected to the second fingerprint IC through jumping wires, each of which connects a predetermined number of second wires among second wires respectively connected to the second group of fingerprint electrodes.

The first group of fingerprint electrodes of the fingerprint sensor may be entirely disposed in a portion having a predetermined width in the first active area, and the second group of fingerprint electrodes of the fingerprint sensor may be partially disposed in a portion having a predetermined width in the first active area. The flexible printed circuit board may be a single flexible printed circuit board on which a single fingerprint IC mounted. The first group of fingerprint electrodes are connected to the single fingerprint IC through first wires, and wherein the second group of fingerprint electrodes are connected to the single fingerprint IC through second wires.

The first group of fingerprint electrodes of the fingerprint sensor may be entirely disposed in a portion having a predetermined width in the first active area, and the second group of fingerprint electrodes of the fingerprint sensor may be partially disposed in a portion having a predetermined width in the first active area. The flexible printed circuit board may include a first flexible printed circuit board on which a first fingerprint IC is mounted and a second flexible printed circuit board on which a second fingerprint IC is mounted. The first group of fingerprint electrodes are connected to the first finger print IC through first wires is mounted, and the second group of fingerprint electrodes are connected to the second finger print IC through second wires.

The first group of fingerprint electrodes of the fingerprint sensor may serve as first touch electrodes and may be entirely disposed in a portion having a predetermined width in the first active area, the second group of fingerprint electrodes of the fingerprint sensor are partially disposed in a portion having a predetermined width in the first active area, and at least one second touch electrode is disposed in a remaining area of the portion having the predetermined width. The flexible printed circuit board is a single flexible printed circuit board on which a single fingerprint-touch IC is mounted, and the single fingerprint-touch IC is connected to the first group of fingerprint electrodes through first wires, is connected to the second group of fingerprint electrodes through second wires, and is connected to the at least one second touch electrode through third wires.

The first group of fingerprint electrodes of the fingerprint sensor serve as first touch electrodes and are entirely disposed in a portion having a predetermined width in the first active area, the second group of fingerprint electrodes of the fingerprint sensor are partially disposed in a portion having a predetermined width in the first active area, and at least one second touch electrode is disposed in a remaining area of the portion having the predetermined width, and the flexible printed circuit board includes a first flexible printed circuit board on which a first fingerprint IC is mounted, and a second flexible printed circuit board on which a second fingerprint IC is mounted. The first group of fingerprint electrodes are connected to the first fingerprint IC, the second group of fingerprint electrodes are connected to the second fingerprint IC through second wires, and the at least one second touch electrode are connected to the second fingerprint IC through third wires.

The flexible printed circuit board may extend toward the outside of a back surface of the first base member through a hole formed in the first bezel area of the first base member. The fingerprint IC may be positioned adjacent to one end of the first base member.

The flexible printed circuit board may extend toward the outside of a back surface of the first base member through a hole formed in the first bezel area of the first base member. The fingerprint IC may be positioned inside the hole.

In another aspect, there is provided a display device comprising a display panel including a second active area, in which an image is displayed, and a second bezel area disposed outside the second active area and a sensor screen disposed on the display panel, the sensor screen including the above-described configurations, wherein the first base member is disposed on the display panel, and the second active area of the display panel corresponds to the first active area of the first base member.

According to the sensor screen and the display device including the same according to the present disclosure, the fingerprint sensor or the fingerprint-touch sensor is disposed in a first area of the first active area of the first base member or the second base member, and the fingerprint IC or the fingerprint-touch IC is disposed on the flexible printed circuit board. Therefore, an effect capable of removing a limit to the size and a formation location of the fingerprint sensor can be obtained.

Further, the first and second fingerprint electrodes are disposed on the upper surface of the first base member or the lower surface of the second base member, and the thickness of the second base member positioned on the first base member is less than the thickness of the first base member. Therefore, the sensing sensitivity of the fingerprint sensor can increase, and at the same time, the sensor screen having a sufficient strength can be obtained.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. Names of components used in the following description may be selected in consideration of facility of specification preparation. Thus, the names of the components may be different from names of components used in real products.

Figure 1:
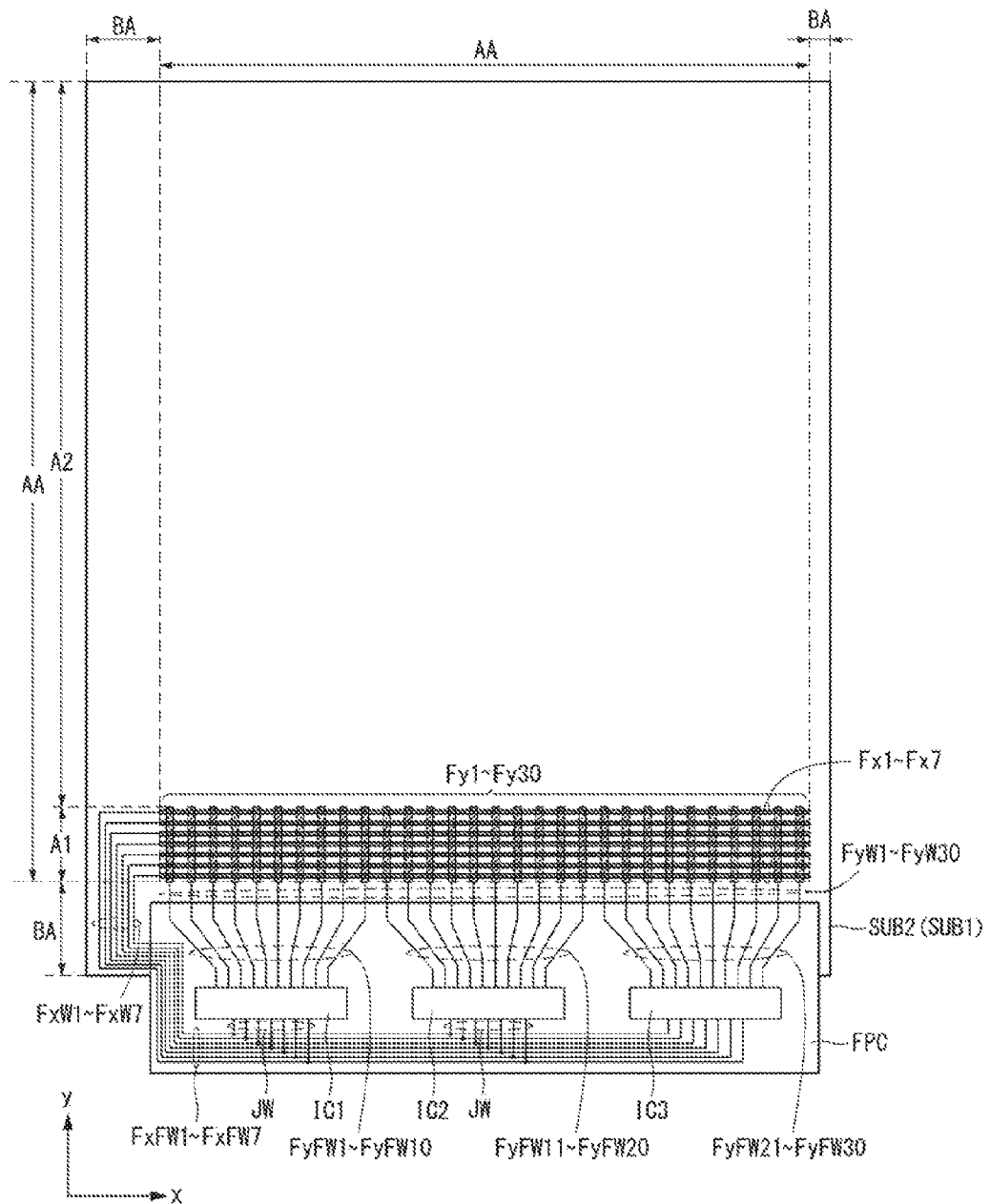
FIG. 1 is a plan view illustrating a sensor screen according to a first embodiment of the invention.

A sensor screen according to a first embodiment of the invention is described with reference to FIG. 1. FIG. 1 is a plan view illustrating a sensor screen according to the first embodiment of the invention. All the components of the sensor screen according to all embodiments of the invention are operatively coupled and configured.

Referring to FIG. 1, the sensor screen according to the first embodiment of the invention includes a first base member SUB1 and a second base member SUB2 which are positioned opposite each other and attached to each other. The sensor screen may further include a flexible printed circuit board FPC, of which one end is disposed at one end of the sensor screen.

The first base member SUB1 has a first thickness, and the second base member SUB2 has a second thickness less than the first thickness. The first and second base members SUB1 and SUB2 may be formed of a transparent material, for example, tempered glass and hard-coated high-hardness plastic.

A fingerprint recognition rate increases as a difference between capacitances of ridges and valleys of a fingerprint increases. Thus, when the thickness of the second base member SUB2 excessively increases, a blurring phenomenon is generated in a fingerprint image formed by the ridges and the valleys of the fingerprint when recognizing the fingerprint. Hence, the fingerprint recognition rate decreases. Thus, it is preferable, but not required, that the thickness of the second base member SUB2 is set to several μm to about 0.3 mm so as to increase the fingerprint recognition rate. When the thickness of the second base member SUB2 is less than several μm, rigidity of the second base member SUB2 is not sufficiently secured. Hence, a fingerprint sensor formed under the second base member SUB2 is not sufficiently protected. When the thickness of the second base member SUB2 exceeds 0.3 mm, the fingerprint recognition rate decreases.

Each of the first base member SUB1 and the second base member SUB2 includes a first active area AA and a first bezel area BA disposed outside the first active area AA. The first active area AA and the first bezel area BA of the first base member SUB1 are positioned correspondingly to the first active area AA and the first bezel area BA of the second base member SUB2.

The first active area AA of one of the first and second base members SUB1 and SUB2 includes a first area A1, in which the fingerprint sensor is disposed, and a second area A2, in which the fingerprint sensor is not disposed. The first embodiment of the invention describes that the fingerprint sensor is disposed in the first active area AA of an upper surface of the first base member SUB1 opposite the second base member SUB2, and the second base member SUB2 is attached to the upper surface of the first base member SUB1, but is not limited thereto. For example, the first embodiment of the invention may be configured such that the fingerprint sensor is disposed in the first active area AA of a lower surface of the second base member SUB2 opposite the first base member SUB1, and the first base member SUB1 is attached to the lower surface of the second base member SUB2.

The fingerprint sensor is entirely disposed in a portion having a predetermined width in the first active area AA. Namely, the fingerprint sensor includes a plurality of first fingerprint electrodes Fx1 to Fx7, which are arranged in the first area A1 of the first active area AA in a first direction (for example, x-axis direction), and a plurality of second fingerprint electrodes Fy1 to Fy30, which are arranged in a second direction (for example, y-axis direction) crossing the first direction. The first fingerprint electrodes Fx1 to Fx7 and the second fingerprint electrodes Fy1 to Fy30 may be insulated from each other with an insulating layer (not shown) interposed therebetween. Alternatively, an insulating pattern (not shown) may be disposed only at each crossing of the first fingerprint electrodes Fx1 to Fx7 and the second fingerprint electrodes Fy1 to Fy30 and may insulate the first fingerprint electrodes Fx1 to Fx7 from the second fingerprint electrodes Fy1 to Fy30.

The first and second fingerprint electrodes Fx1 to Fx7 and Fy1 to Fy30 may be formed using a transparent conductive material, such as ITO (indium tin oxide), IZO (indium zinc oxide), and GZO (gallium-doped zinc oxide), chromium oxide having a low reflectance, or blackening metal material, for example, molybdenum (Mo). Alternatively, one of the first and second fingerprint electrodes may be formed of the transparent conductive material, and the other may be formed of metal material.

The insulating layer or the insulating pattern may be formed of inorganic insulating material, such as silicon oxide and silicon nitride, or a photosensitive organic insulating material, such as PAC.

The first fingerprint electrodes Fx1 to Fx7 and the second fingerprint electrodes Fy1 to Fy30 each have a pitch of about 50 μm to 100 μm and a width of about 5 μm to 50 μm.

In the first bezel area BA, a plurality of first fingerprint wires FxW1 to FxW7 respectively connected to respective one ends of the plurality of first fingerprint electrodes Fx1 to Fx7 and a plurality of second fingerprint wires FyW1 to FyW30 respectively connected to respective one ends of the plurality of second fingerprint electrodes Fy1 to Fy30 are disposed.

The first embodiment of the invention describes that the plurality of first fingerprint wires FxW1 to FxW7 are respectively connected to the one ends of the plurality of first fingerprint electrodes Fx1 to Fx7, but is not limited thereto. For example, the first embodiment of the invention may be configured such that the odd-numbered first fingerprint wires FxW1, FxW3, FxW5, and FxW7 are respectively connected to one ends of the odd-numbered first fingerprint electrodes Fx1, Fx3, Fx5, and Fx7, and the remaining even-numbered first fingerprint wires FxW2, FxW4, and FxW6 are respectively connected to the other ends of the even-numbered first fingerprint electrodes Fx2, Fx4, and Fx6. Alternatively, the first embodiment of the invention may be configured such that some (for example, FxW1 to FxW4) of the first fingerprint wires are respectively connected to one ends of some (for example, Fx1 to Fx4) of the first fingerprint electrodes, and the remaining first fingerprint wires (for example, FxW5 to FxW7) are respectively connected to the other ends of the remaining first fingerprint electrodes (for example, Fx5 to Fx7).

The flexible printed circuit board FPC includes a plurality of first flexible fingerprint wires FxFW1 to FxFW7 respectively connected to the plurality of first fingerprint wires FxW1 to FxW7 and a plurality of second flexible fingerprint wires FyFW1 to FyFW30 respectively connected to the plurality of second fingerprint wires FyW1 to FyW30.

The flexible printed circuit board FPC includes a first fingerprint integrated circuit (IC) IC1, to which the first flexible fingerprint wires FxFW1 to FxFW7 and the 2-1 flexible fingerprint wires FyFW1 to FyFW10 are connected, a second fingerprint IC IC2, to which the first flexible fingerprint wires FxFW1 to FxFW7 and the 2-2 flexible fingerprint wires FyFW11 to FyFW20 are connected, and a third fingerprint IC IC3, to which the first flexible fingerprint wires FxFW1 to FxFW7 and the 2-3 flexible fingerprint wires FyFW21 to FyFW30 are connected. Namely, the first flexible fingerprint wires FxFW1 to FxFW7 are connected to all of the first to third fingerprint ICs IC1 to IC3, and the plurality of second fingerprint wires FyW1 to FyW30 are divided into groups each including the same number of second fingerprint wires. The 2-1 flexible fingerprint wires FyFW1 to FyFW10 are connected to the first fingerprint IC IC1, the 2-2 flexible fingerprint wires FyFW11 to FyFW20 are connected to the second fingerprint IC IC2, and the 2-3 flexible fingerprint wires FyFW21 to FyFW30 are connected to the third fingerprint IC IC3. The plurality of first flexible fingerprint wires FxFW1 to FxFW7 are connected to the first and second fingerprint ICs IC1 and IC2 positioned close to a location, to which the first fingerprint electrodes Fx1 to Fx7 and the first flexible fingerprint wires FxFW1 to FxFW7 are connected, through jumping wires JW and are directly connected to the third fingerprint IC IC3.

The first to third fingerprint ICs IC1 to IC3 supply a driving pulse to one (for example, the first fingerprint electrodes Fx1 to Fx7 or the second fingerprint electrodes Fy1 to Fy30) of the first fingerprint electrodes Fx1 to Fx7 and the second fingerprint electrodes Fy1 to Fy30 and sense changes in capacitances of ridges and valleys of a user's fingerprint in accordance with a touch operation using user's finger through the other (for example, the second fingerprint electrodes Fy1 to Fy30 or the first fingerprint electrodes Fx1 to Fx7), thereby recognizing the user's fingerprint.

A reason why the plurality of fingerprint ICs are disposed in the sensor screen according to the first embodiment of the invention is because the fingerprint electrode has to have the very small pitch so as to recognize the finger fingerprint. Further, in the sensor screen according to the first embodiment of the invention, because the first area A1 having the predetermined width in the first active area AA is entirely used as a fingerprint sensor area, the number of ICs for processing the fingerprint sensing has to increase based on an increase in the number of channels.

In the sensor screen according to the first embodiment of the invention, the fingerprint sensor is disposed in the first area A1 of the first active area AA of the first base member SUB1 or the second base member SUB2, and the fingerprint IC for the fingerprint sensing is disposed in the flexible printed circuit board FPC. Therefore, an assembly structure for coupling the fingerprint sensor with a push button is unnecessary, and a design limit required to integrate a sensor array with the fingerprint IC can be removed. Hence, an effect capable of removing a limit to the size and the formation location of the fingerprint sensor can be obtained.

The first and second fingerprint electrodes are disposed on the upper surface of the first base member SUB1 or the lower surface of the second base member SUB2, and the thickness of the second base member SUB2 positioned on the first base member SUB1 is less than the thickness of the first base member SUB1. Therefore, the sensing sensitivity of the fingerprint sensor can increase.

Both the first and second base members SUB1 and SUB2 may be formed of tempered glass. Alternatively, the first base member SUB1 may be formed of tempered glass, and the second base member SUB2 may be formed of hard-coated high-hardness plastic. Therefore, the sensor screen having a sufficient strength can be obtained.

Figure 2:
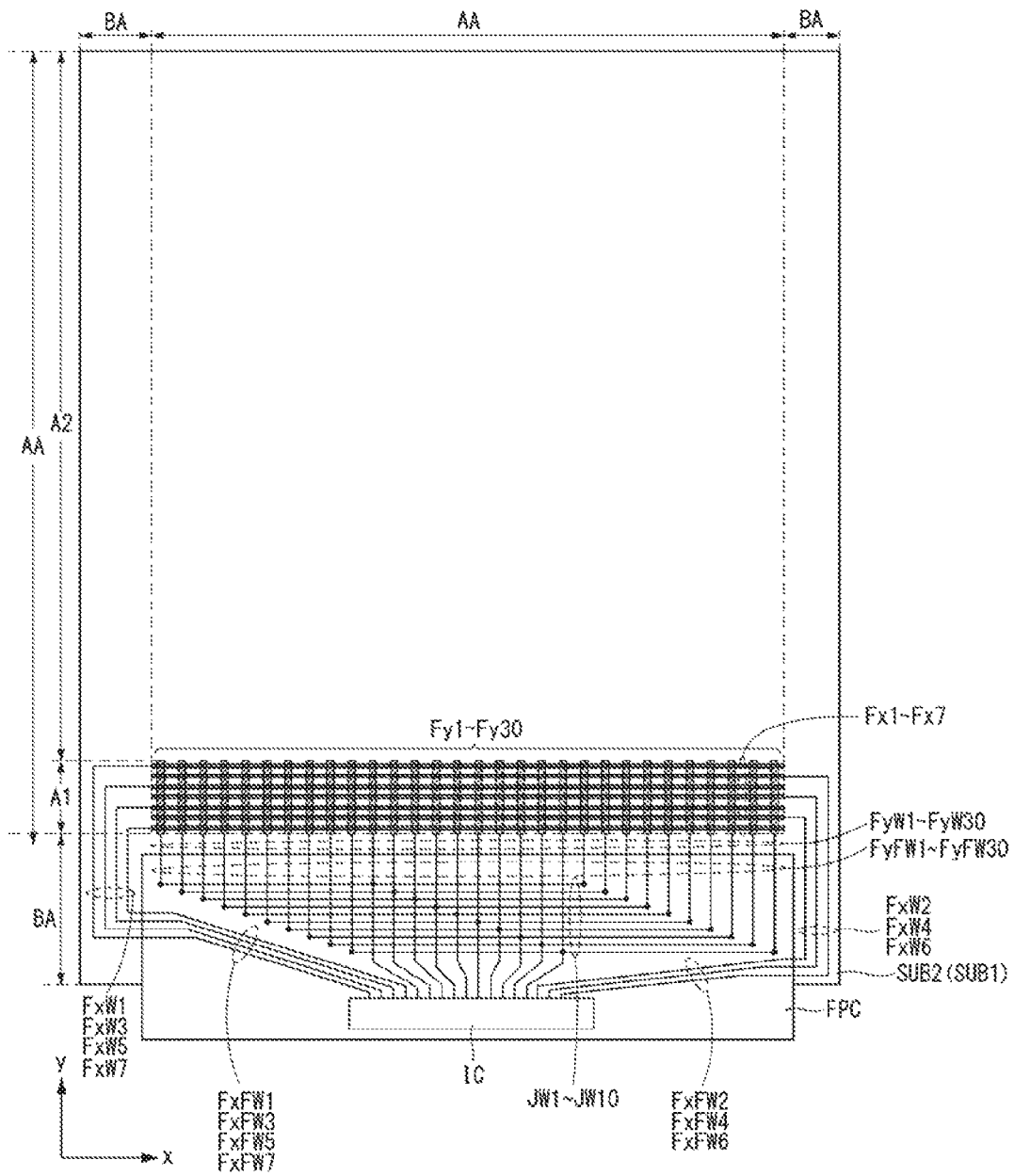
FIG. 2 is a plan view illustrating a sensor screen according to a second embodiment of the invention.

Next, a sensor screen according to a second embodiment of the invention is described with reference to FIG. 2. FIG. 2 is a plan view illustrating a sensor screen according to the second embodiment of the invention.

Referring to FIG. 2, the sensor screen according to the second embodiment of the invention is substantially the same as the sensor screen according to the first embodiment of the invention, except first fingerprint wires disposed in a first bezel area and flexible fingerprint wires and a fingerprint IC disposed on a flexible printed circuit board. Therefore, the repeated description is omitted, and only a configuration of the second embodiment of the invention different from the first embodiment of the invention is described.

In a first bezel area BA, 1-1 fingerprint wires FxW1, FxW3, FxW5, and FxW7 respectively connected to respective one ends of odd-numbered 1-1 fingerprint electrodes Fx1, Fx3, Fx5, and Fx7 of a plurality of first fingerprint electrodes Fx1 to Fx7, 1-2 fingerprint wires FxW2, FxW4, and FxW6 respectively connected to the other ends of even-numbered 1-2 fingerprint electrodes Fx2, Fx4, and Fx6, and a plurality of second fingerprint wires FyW1 to FyW30 respectively connected to a plurality of second fingerprint electrodes Fy1 to Fy30 are disposed.

The second embodiment of the invention describes that the 1-1 fingerprint wires FxW1, FxW3, FxW5, and FxW7 and the 1-2 fingerprint wires FxW2, FxW4, and FxW6 are disposed on both sides of the first bezel area BA and are respectively connected to the one ends of the odd-numbered 1-1 fingerprint electrodes Fx1, Fx3, Fx5, and Fx7 and the other ends of the even-numbered 1-2 fingerprint electrodes Fx2, Fx4, and Fx6, but is not limited thereto. For example, the second embodiment of the invention may be configured such that all of the first fingerprint wires FxW1 to FxW7 are disposed on one side of the first bezel area BA and are respectively connected to the one ends of the first fingerprint electrodes Fx1 to Fx7. Alternatively, the second embodiment of the invention may be configured such that some (for example, FxW1 to FxW4) of the first fingerprint wires are respectively connected to the one ends of some (for example, Fx1 to Fx4) of the first fingerprint electrodes, and the remaining first fingerprint wires (for example, FxW5 to FxW7) are respectively connected to the other ends of the remaining first fingerprint electrodes (for example, Fx5 to Fx7).

A flexible printed circuit board FPC includes a plurality of 1-1 flexible fingerprint wires FxFW1, FxFW3, FxFW5, and FxFW7 respectively connected to the plurality of 1-1 fingerprint wires FxW1, FxW3, FxW5, and FxW7, a plurality of 1-2 flexible fingerprint wires FxFW2, FxFW4, and FxFW6 respectively connected to the plurality of 1-2 fingerprint wires FxW2, FxW4, and FxW6, and a plurality of second flexible fingerprint wires FyFW1 to FyFW30 respectively connected to the plurality of second fingerprint wires FyW1 to FyW30.

The flexible printed circuit board FPC includes jumping wires JW1 to JW10, each of which connects a predetermined number of second flexible fingerprint wires among the plurality of second flexible fingerprint wires FyFW1 to FyFW30. For example, the first jumping wire JW1 connects the 1st, 11th, and 21th second flexible fingerprint wires FyFW1, FyFW11, and FyFW21. Similar to this, the second jumping wire JW2 connects the 2nd, 12th, and 22th second flexible fingerprint wires FyFW2, FyFW12, and FyFW22; the third jumping wire JW3 connects the 3rd, 13th, and 23th second flexible fingerprint wires FyFW3, FyFW13, and FyFW23; the fourth jumping wire JW4 connects the 4th, 14th, and 24th second flexible fingerprint wires FyFW4, FyFW14, and FyFW24; the fifth jumping wire JW5 connects the 5th, 15th, and 25th second flexible fingerprint wires FyFW5, FyFW15, and FyFW25; the sixth jumping wire JW6 connects the 6th, 16th, and 26th second flexible fingerprint wires FyFW6, FyFW16, and FyFW26; the seventh jumping wire JW7 connects the 7th, 17th, and 27th second flexible fingerprint wires FyFW7, FyFW17, and FyFW27; the eighth jumping wire JW8 connects the 8th, 18th, and 28th second flexible fingerprint wires FyFW8, FyFW18, and FyFW28; the ninth jumping wire JW9 connects the 9th, 19th, and 29th second flexible fingerprint wires FyFW9, FyFW19, and FyFW29; and the tenth jumping wire JW10 connects the 10th, 20th, and 30th second flexible fingerprint wires FyFW10, FyFW20, and FyFW30.

The flexible printed circuit board FPC includes a fingerprint IC, to which the plurality of 1-1 and 1-2 flexible fingerprint wires FxFW1 to FxFW7 and the ten second fingerprint wires (for example, FyFW11 to FyFW20 in FIG. 2) of the second fingerprint wires FyW1 to FyW30 connected to the first to tenth jumping wires JW1 to JW10 are connected.

Because the sensor screen according to the second embodiment of the invention forms a predetermined number of second flexible fingerprint wires as a group using the jumping wires (for example, one jumping wire connects the three second flexible fingerprint wires in FIG. 2), the sensor screen according to the second embodiment of the invention can reduce the number of fingerprint ICs compared to the sensor screen according to the first embodiment of the invention. Hence, the second embodiment of the invention can reduce the size of the flexible printed circuit board and the manufacturing cost, in addition to the effect capable of being obtained from the sensor screen according to the first embodiment of the invention.

Figure 3:
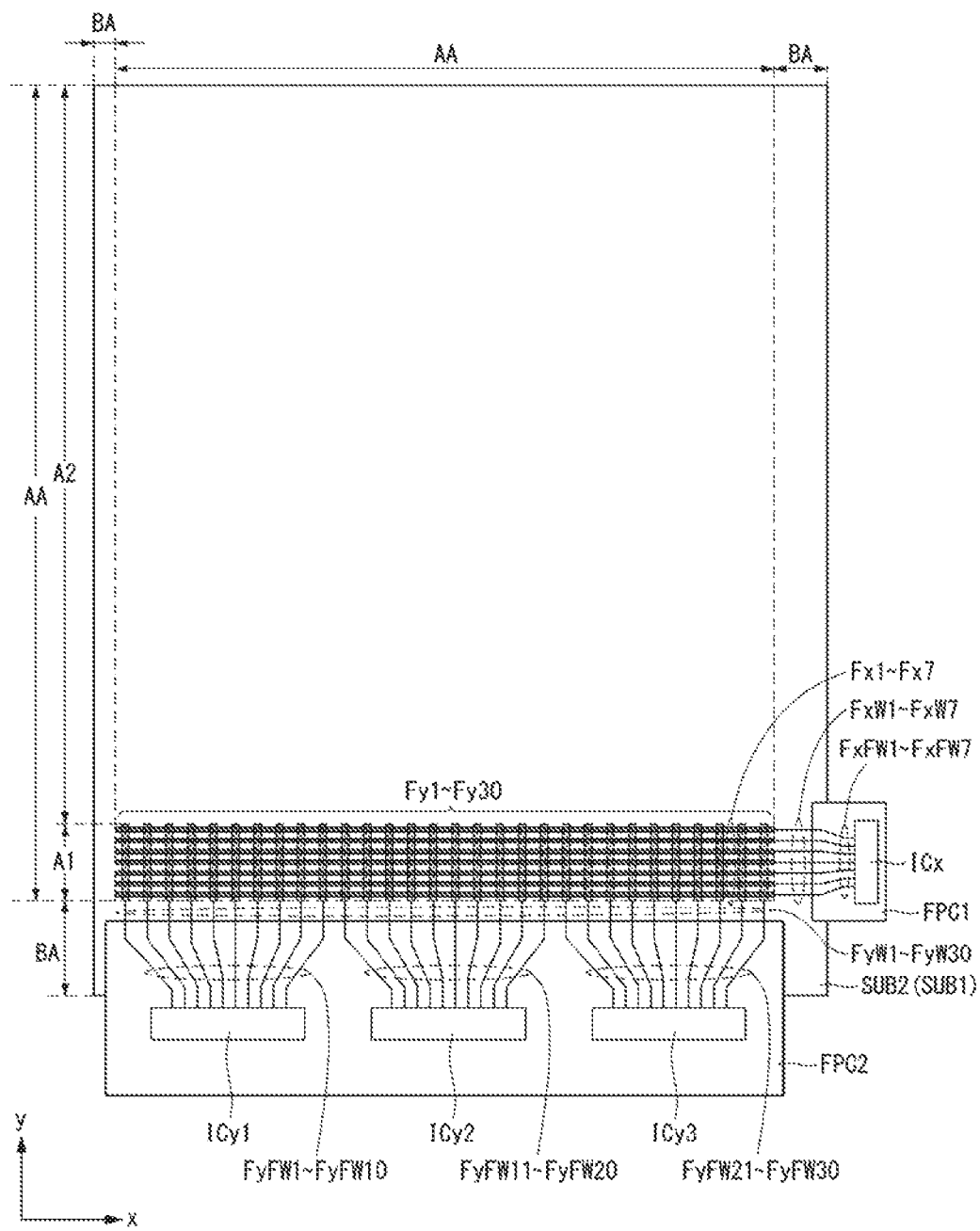
FIG. 3 is a plan view illustrating a sensor screen according to a third embodiment of the invention.

Next, a sensor screen according to a third embodiment of the invention is described with reference to FIG. 3. FIG. 3 is a plan view illustrating a sensor screen according to the third embodiment of the invention.

Referring to FIG. 3, the sensor screen according to the third embodiment of the invention is substantially the same as the sensor screen according to the first embodiment of the invention, except a flexible printed circuit board and the number of fingerprint ICs, and a disposition and a connection relationship of first and second fingerprint wires and first and second flexible fingerprint wires. Therefore, the repeated description is omitted, and only a configuration of the third embodiment of the invention different from the first embodiment of the invention is described.

In a first bezel area BA, a plurality of first fingerprint wires FxW1 to FxW7 respectively connected to respective one ends of a plurality of first fingerprint electrodes Fx1 to Fx7 and a plurality of second fingerprint wires FyW1 to FyW30 respectively connected to a plurality of second fingerprint electrodes Fy1 to Fy30 are disposed.

First and second flexible printed circuit boards FPC1 and FPC2 are respectively disposed on one side of the first bezel area BA and the other side adjacent to the one side.

The first flexible printed circuit board FPC1 includes a plurality of first flexible fingerprint wires FxFW1 to FxFW7 respectively connected to the plurality of first fingerprint wires FxW1 to FxW7 and a first fingerprint IC ICx, to which the plurality of first flexible fingerprint wires FxFW1 to FxFW7 are connected.

The second flexible printed circuit board FPC2 includes a plurality of second flexible fingerprint wires FyFW1 to FyFW30 respectively connected to the plurality of second fingerprint wires FyW1 to FyW30 and 2-1 to 2-3 fingerprint ICs ICy1 to ICy3 connected to the plurality of second flexible fingerprint wires FyFW1 to FyFW30. More specifically, the 2-1 flexible fingerprint wires FyFW1 to FyFW10 are connected to the 2-1 fingerprint IC ICy1, the 2-2 flexible fingerprint wires FyFW11 to FyFW20 are connected to the 2-2 fingerprint IC ICy2, and the 2-3 flexible fingerprint wires FyFW21 to FyFW30 are connected to the 2-3 fingerprint IC ICy3.

The first fingerprint IC ICx supplies a driving pulse to one of the first fingerprint electrodes Fx1 to Fx7 and the second fingerprint electrodes Fy1 to Fy30 or senses changes in capacitances of ridges and valleys of a user's fingerprint in accordance with a touch operation using user's finger through the other fingerprint electrodes, thereby recognizing the user's fingerprint. When the first fingerprint IC ICx supplies the driving pulse to the first fingerprint electrodes Fx1 to Fx7, the 2-1 to 2-3 fingerprint ICs ICy1 to ICy3 sense changes in the capacitances of the ridges and the valleys of the user's fingerprint in accordance with the touch operation using the user's finger through the second fingerprint electrodes Fy1 to Fy30, thereby recognizing the user's fingerprint. On the other hand, when the 2-1 to 2-3 fingerprint ICs ICy1 to ICy3 supply the driving pulse to the second fingerprint electrodes Fy1 to Fy30, the first fingerprint IC ICx sense changes in the capacitances of the ridges and the valleys of the user's fingerprint in accordance with the touch operation using the user's finger through the first fingerprint electrodes Fx1 to Fx7, thereby recognizing the user's fingerprint.

Because the sensor screen according to the third embodiment of the invention dividedly performs the driving operation and the sensing operation using the fingerprint ICs disposed on the two flexible printed circuit boards, the third embodiment of the invention can simplify the wiring structure and can clarify a drive relationship, in addition to the effect capable of being obtained from the sensor screen according to the first embodiment of the invention.

Figure 4:
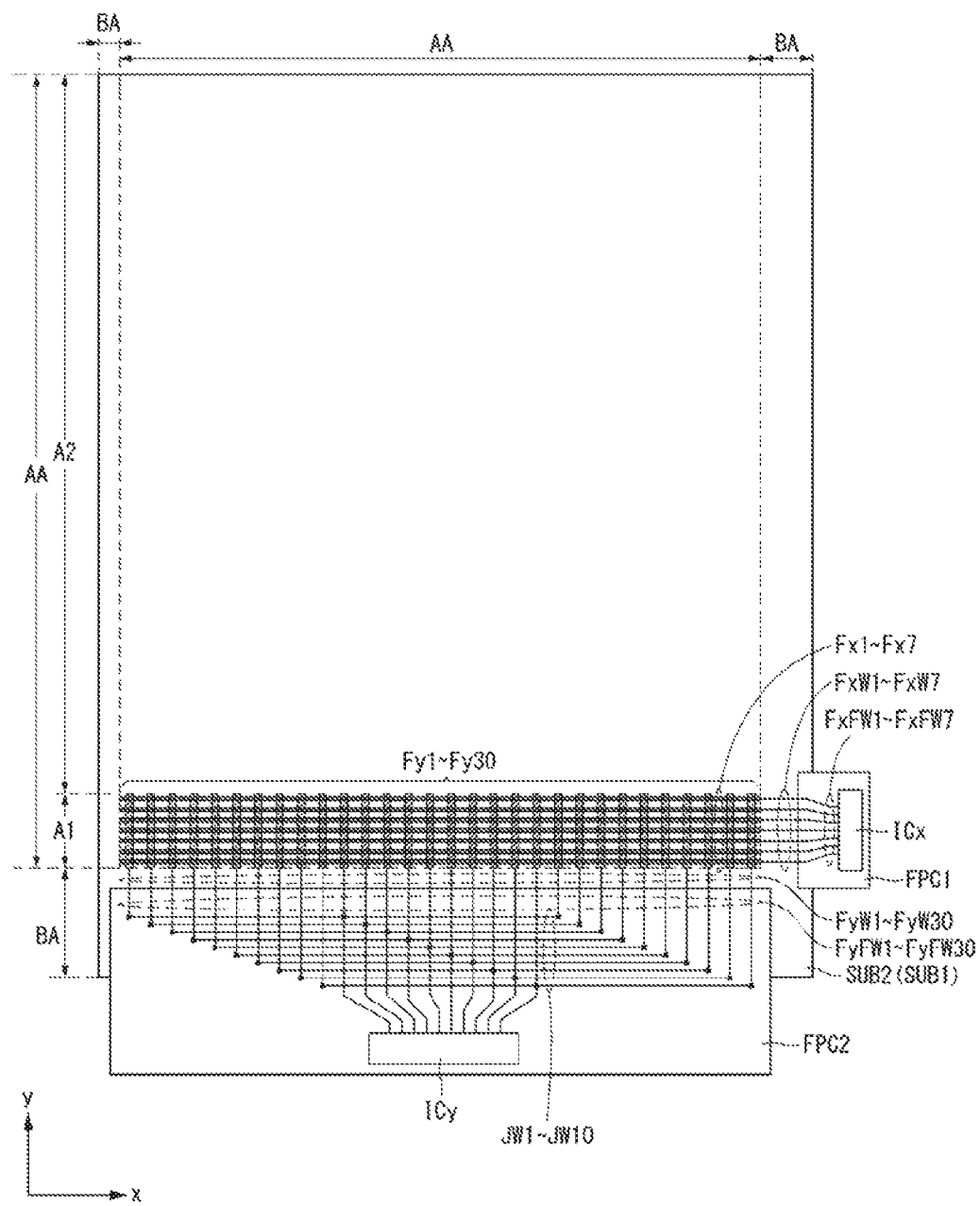
FIG. 4 is a plan view illustrating a sensor screen according to a fourth embodiment of the invention.

Next, a sensor screen according to a fourth embodiment of the invention is described with reference to FIG. 4. FIG. 4 is a plan view illustrating a sensor screen according to the fourth embodiment of the invention.

Referring to FIG. 4, the sensor screen according to the fourth embodiment of the invention is substantially the same as the sensor screen according to the second embodiment of the invention, except a flexible printed circuit board and the number of fingerprint ICs, and a disposition and a connection relationship of first and second fingerprint wires and first and second flexible fingerprint wires. Therefore, the repeated description is omitted, and only a configuration of the fourth embodiment of the invention different from the second embodiment of the invention is described.

In a first bezel area BA, a plurality of first fingerprint wires FxW1 to FxW7 respectively connected to respective one ends of a plurality of first fingerprint electrodes Fx1 to Fx7 and a plurality of second fingerprint wires FyW1 to FyW30 respectively connected to a plurality of second fingerprint electrodes Fy1 to Fy30 are disposed.

First and second flexible printed circuit boards FPC1 and FPC2 are respectively disposed on one side of the first bezel area BA and the other side adjacent to the one side.

The first flexible printed circuit board FPC1 includes a plurality of first flexible fingerprint wires FxFW1 to FxFW7 respectively connected to the plurality of first fingerprint wires FxW1 to FxW7 and a first fingerprint IC ICx, to which the plurality of first flexible fingerprint wires FxFW1 to FxFW7 are connected.

The second flexible printed circuit board FPC2 includes a plurality of second flexible fingerprint wires FyFW1 to FyFW30 respectively connected to the plurality of second fingerprint wires FyW1 to FyW30 and a plurality of jumping wires JW1 to JW10, each of which connects a predetermined number of second flexible fingerprint wires among the plurality of second flexible fingerprint wires FyFW1 to FyFW30.

For example, the first jumping wire JW1 connects the 1st, 11th, and 21th second flexible fingerprint wires FyFW1, FyFW11, and FyFW21. Similar to this, the second jumping wire JW2 connects the 2nd, 12th, and 22th second flexible fingerprint wires FyFW2, FyFW12, and FyFW22; the third jumping wire JW3 connects the 3rd, 13th, and 23th second flexible fingerprint wires FyFW3, FyFW13, and FyFW23; the fourth jumping wire JW4 connects the 4th, 14th, and 24th second flexible fingerprint wires FyFW4, FyFW14, and FyFW24; the fifth jumping wire JW5 connects the 5th, 15th, and 25th second flexible fingerprint wires FyFW5, FyFW15, and FyFW25; the sixth jumping wire JW6 connects the 6th, 16th, and 26th second flexible fingerprint wires FyFW6, FyFW16, and FyFW26; the seventh jumping wire JW7 connects the 7th, 17th, and 27th second flexible fingerprint wires FyFW7, FyFW17, and FyFW27; the eighth jumping wire JW8 connects the 8th, 18th, and 28th second flexible fingerprint wires FyFW8, FyFW18, and FyFW28; the ninth jumping wire JW9 connects the 9th, 19th, and 29th second flexible fingerprint wires FyFW9, FyFW19, and FyFW29; and the tenth jumping wire JW10 connects the 10th, 20th, and 30th second flexible fingerprint wires FyFW10, FyFW20, and FyFW30.

The second flexible printed circuit board FPC2 includes a second fingerprint IC ICy, to which the ten second fingerprint wires (for example, FyFW11 to FyFW20 in FIG. 4) of the second fingerprint wires FyW1 to FyW30 connected to the first to tenth jumping wires JW1 to JW10 are connected.

The first fingerprint IC ICx supplies a driving pulse to one of the first fingerprint electrodes Fx1 to Fx7 and the second fingerprint electrodes Fy1 to Fy30 or senses changes in capacitances of ridges and valleys of a user's fingerprint in accordance with a touch operation using user's finger through the other fingerprint electrodes, thereby recognizing the user's fingerprint. When the first fingerprint IC ICx supplies the driving pulse to the first fingerprint electrodes Fx1 to Fx7, the second fingerprint IC ICy senses changes in the capacitances of the ridges and the valleys of the user's fingerprint in accordance with the touch operation using the user's finger through the second fingerprint electrodes Fy1 to Fy30, thereby recognizing the user's fingerprint. On the other hand, when the second fingerprint IC ICy supplies the driving pulse to the second fingerprint electrodes Fy1 to Fy30, the first fingerprint IC ICx senses changes in the capacitances of the ridges and the valleys of the user's fingerprint in accordance with the touch operation using the user's finger through the first fingerprint electrodes Fx1 to Fx7, thereby recognizing the user's fingerprint.

Because the sensor screen according to the fourth embodiment of the invention dividedly performs the driving operation and the sensing operation using the fingerprint ICs disposed on the two flexible printed circuit boards, the fourth embodiment of the invention can simplify the wiring structure and can clarify a drive relationship, in addition to the effect capable of being obtained from the sensor screen according to the first and second embodiments of the invention.

Figure 5:
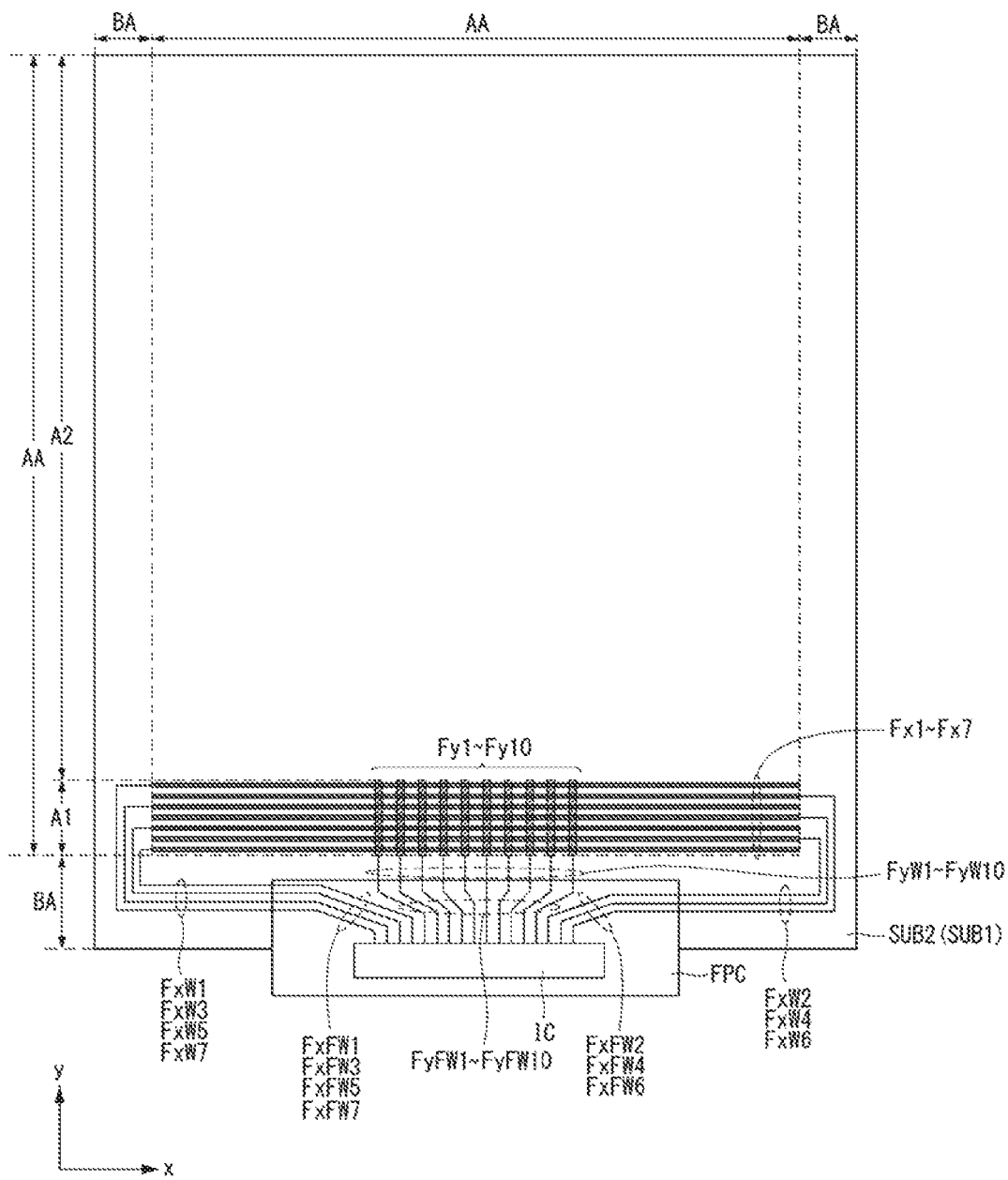
FIG. 5 is a plan view illustrating a sensor screen according to a fifth embodiment of the invention.

Next, a sensor screen according to a fifth embodiment of the invention is described with reference to FIG. 5. FIG. 5 is a plan view illustrating a sensor screen according to the fifth embodiment of the invention.

Referring to FIG. 5, the sensor screen according to the fifth embodiment of the invention is substantially the same as the sensor screen according to the first embodiment of the invention, except that second fingerprint electrodes of a fingerprint sensor disposed in a first active area are disposed only in a portion of a first area of the first active area, and only one fingerprint IC is disposed on a flexible printed circuit board. Therefore, the repeated description is omitted, and only a configuration of the fifth embodiment of the invention different from the first embodiment of the invention is described.

In a first area A1 of a first active area AA, a plurality of first fingerprint electrodes Fx1 to Fx7 arranged in a first direction (for example, x-axis direction) and a plurality of second fingerprint electrodes Fy1 to Fy10 arranged in a second direction (for example, y-axis direction) crossing the first direction are disposed. The plurality of first fingerprint electrodes Fx1 to Fx7 are arranged in the same manner as the first embodiment of the invention, but the plurality of second fingerprint electrodes Fy1 to Fy10 are different from the sensor screen according to the first embodiment of the invention in that the second fingerprint electrodes Fy1 to Fy10 are arranged only in a portion of the first area A1. Further, the fifth embodiment of the invention describes that the second fingerprint electrodes are disposed almost in the middle of the first area A1, as an example. However, the second fingerprint electrodes may be disposed so that they lean to one side as long as they are inside the first area A1.

In a first bezel area BA, 1-1 fingerprint wires FxW1, FxW3, FxW5, and FxW7 respectively connected to one ends of odd-numbered 1-1 fingerprint electrodes Fx1, Fx3, Fx5, and Fx7 of the plurality of first fingerprint electrodes Fx1 to Fx7, 1-2 fingerprint wires FxW2, FxW4, and FxW6 respectively connected to the other ends of even-numbered 1-2 fingerprint electrodes Fx2, Fx4, and Fx6, and a plurality of second fingerprint wires FyW1 to FyW10 respectively connected to the plurality of second fingerprint electrodes Fy1 to Fy10 are disposed.

The fifth embodiment of the invention describes that the 1-1 fingerprint wires FxW1, FxW3, FxW5, and FxW7 and the 1-2 fingerprint wires FxW2, FxW4, and FxW6 are disposed on both sides of the first bezel area BA and are connected to the one ends of the odd-numbered 1-1 fingerprint electrodes Fx1, Fx3, Fx5, and Fx7 and the other ends of the even-numbered 1-2 fingerprint electrodes Fx2, Fx4, and Fx6, but is not limited thereto. For example, the fifth embodiment of the invention may be configured such that all of the first fingerprint wires FxW1 to FxW7 are disposed on one side of the first bezel area BA and are connected to one ends and the other ends of the first fingerprint electrodes Fx1 to Fx7. Alternatively, the fifth embodiment of the invention may be configured such that some (for example, FxW1 to FxW4) of the first fingerprint wires FxW1 to FxW7 are respectively connected to the one ends of some (for example, Fx1 to Fx4) of the first fingerprint electrodes Fx1 to Fx7, and the remaining first fingerprint wires (for example, FxW5 to FxW7) are respectively connected to the other ends of the remaining first fingerprint electrodes (for example, Fx5 to Fx7).

A flexible printed circuit board FPC includes a plurality of 1-1 flexible fingerprint wires FxFW1, FxFW3, FxFW5, and FxFW7 respectively connected to the plurality of 1-1 fingerprint wires FxW1, FxW3, FxW5, and FxW7, a plurality of 1-2 flexible fingerprint wires FxFW2, FxFW4, and FxFW6 respectively connected to the plurality of 1-2 fingerprint wires FxW2, FxW4, and FxW6, and a plurality of second flexible fingerprint wires FyFW1 to FyFW10 respectively connected to the plurality of second fingerprint wires FyW1 to FyW10. The flexible printed circuit board FPC includes a fingerprint IC, to which the 1-1 flexible fingerprint wires FxFW1, FxFW3, FxFW5, and FxFW7, the 1-2 flexible fingerprint wires FxFW2, FxFW4, and FxFW6, and the second flexible fingerprint wires FyFW1 to FyFW10 are connected.

The sensor screen according to the fifth embodiment of the invention has a smaller sensing area than the sensor screen according to the first embodiment of the invention, but can reduce the number of fingerprint ICs and can reduce the number of fingerprint wires FxW1 to FxW7 and FyW1 to FyW10 and the number of flexible fingerprint wires FxFW1 to FxFW7 and FyFW1 to FyFW10 for connecting the first and second fingerprint electrodes Fx1 to Fx7 and Fy1 to Fy10 and the fingerprint IC. Hence, the fifth embodiment of the invention can simplify the wiring structure.

Figure 6:
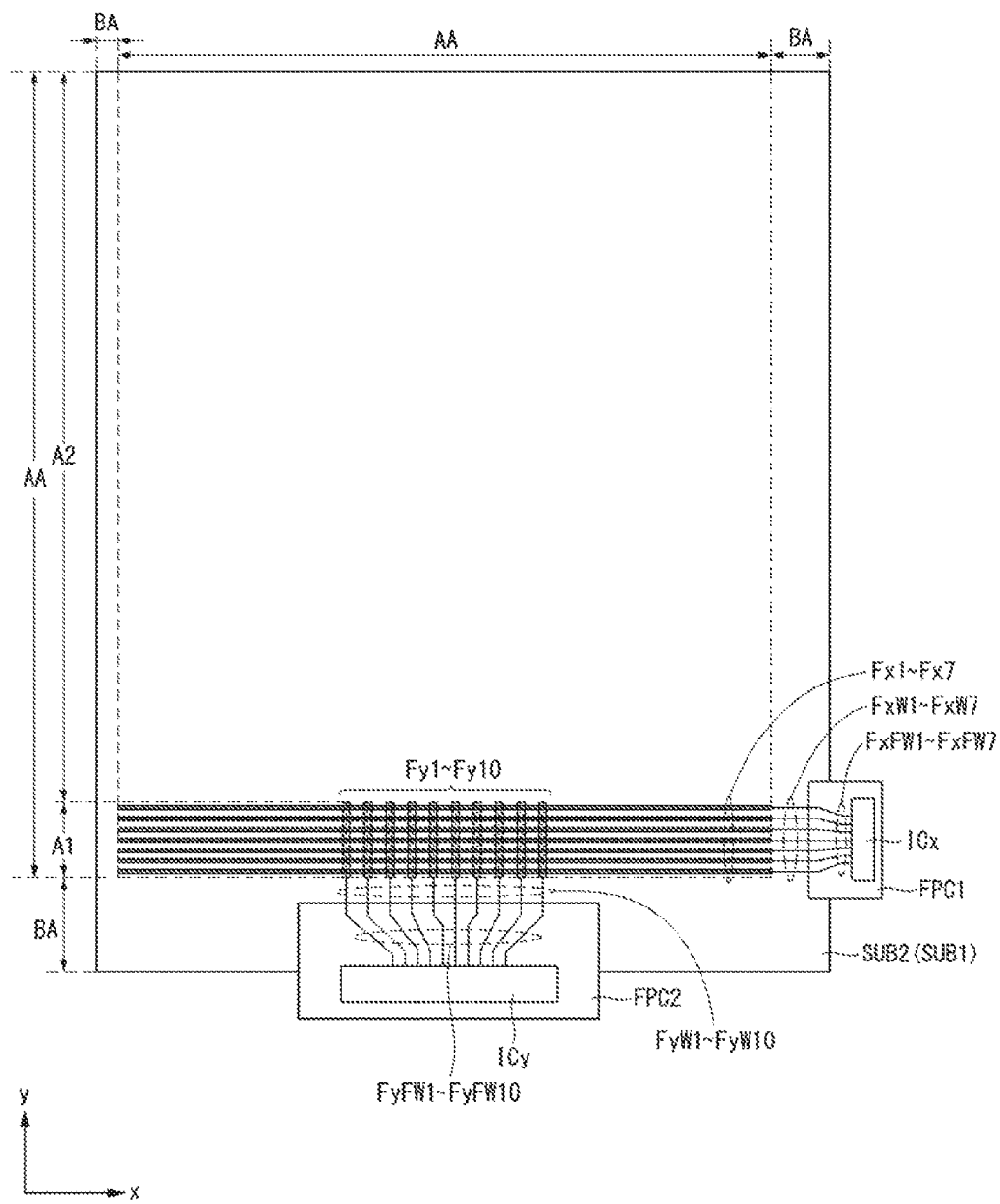
FIG. 6 is a plan view illustrating a sensor screen according to a sixth embodiment of the invention.

Next, a sensor screen according to a sixth embodiment of the invention is described with reference to FIG. 6. FIG. 6 is a plan view illustrating a sensor screen according to the sixth embodiment of the invention.

Referring to FIG. 6, the sensor screen according to the sixth embodiment of the invention is substantially the same as the sensor screen according to the fifth embodiment of the invention, except that flexible printed circuit boards are respectively assigned to first fingerprint wires and second fingerprint wires, and an arrangement and a connection relationship of the fingerprint wires vary depending on the flexible printed circuit boards. Therefore, the repeated description is omitted, and only a configuration of the sixth embodiment of the invention different from the fifth embodiment of the invention is described.

In a first bezel area BA, a plurality of first fingerprint wires FxW1 to FxW7 respectively connected to respective one ends of a plurality of first fingerprint electrodes Fx1 to Fx7 and a plurality of second fingerprint wires FyW1 to FyW10 respectively connected to respective one ends of a plurality of second fingerprint electrodes Fy1 to Fy10 are disposed.

First and second flexible printed circuit boards FPC1 and FPC2 are respectively disposed on one side of the first bezel area BA and the other side adjacent to the one side.

The first flexible printed circuit board FPC1 includes a plurality of first flexible fingerprint wires FxFW1 to FxFW7 respectively connected to the plurality of first fingerprint wires FxW1 to FxW7 and a first fingerprint IC ICx, to which the plurality of first flexible fingerprint wires FxFW1 to FxFW7 are connected.

The second flexible printed circuit board FPC2 includes a plurality of second flexible fingerprint wires FyFW1 to FyFW10 respectively connected to the plurality of second fingerprint wires FyW1 to FyW10 and a second fingerprint IC ICy, to which the plurality of second flexible fingerprint wires FyFW1 to FyFW10 are connected.

The first fingerprint IC ICx supplies a driving pulse to one of the first fingerprint electrodes Fx1 to Fx7 and the second fingerprint electrodes Fy1 to Fy10 or senses changes in capacitances of ridges and valleys of a user's fingerprint in accordance with a touch operation using user's finger through the other fingerprint electrodes, thereby recognizing the user's fingerprint. When the first fingerprint IC ICx supplies the driving pulse to the first fingerprint electrodes Fx1 to Fx7, the second fingerprint IC ICy senses changes in the capacitances of the ridges and the valleys of the user's fingerprint in accordance with the touch operation using the user's finger through the second fingerprint electrodes Fy1 to Fy10, thereby recognizing the user's fingerprint. On the other hand, when the second fingerprint IC ICy supplies the driving pulse to the second fingerprint electrodes Fy1 to Fy10, the first fingerprint IC ICx senses changes in the capacitances of the ridges and the valleys of the user's fingerprint in accordance with the touch operation using the user's finger through the first fingerprint electrodes Fx1 to Fx7, thereby recognizing the user's fingerprint.

Because the sensor screen according to the sixth embodiment of the invention dividedly performs the driving operation and the sensing operation using the fingerprint ICs disposed on the two flexible printed circuit boards, the sixth embodiment of the invention can simplify the wiring structure and can clarify a drive relationship, in addition to the effect capable of being obtained from the sensor screen according to the fifth embodiment of the invention.

Figure 7:
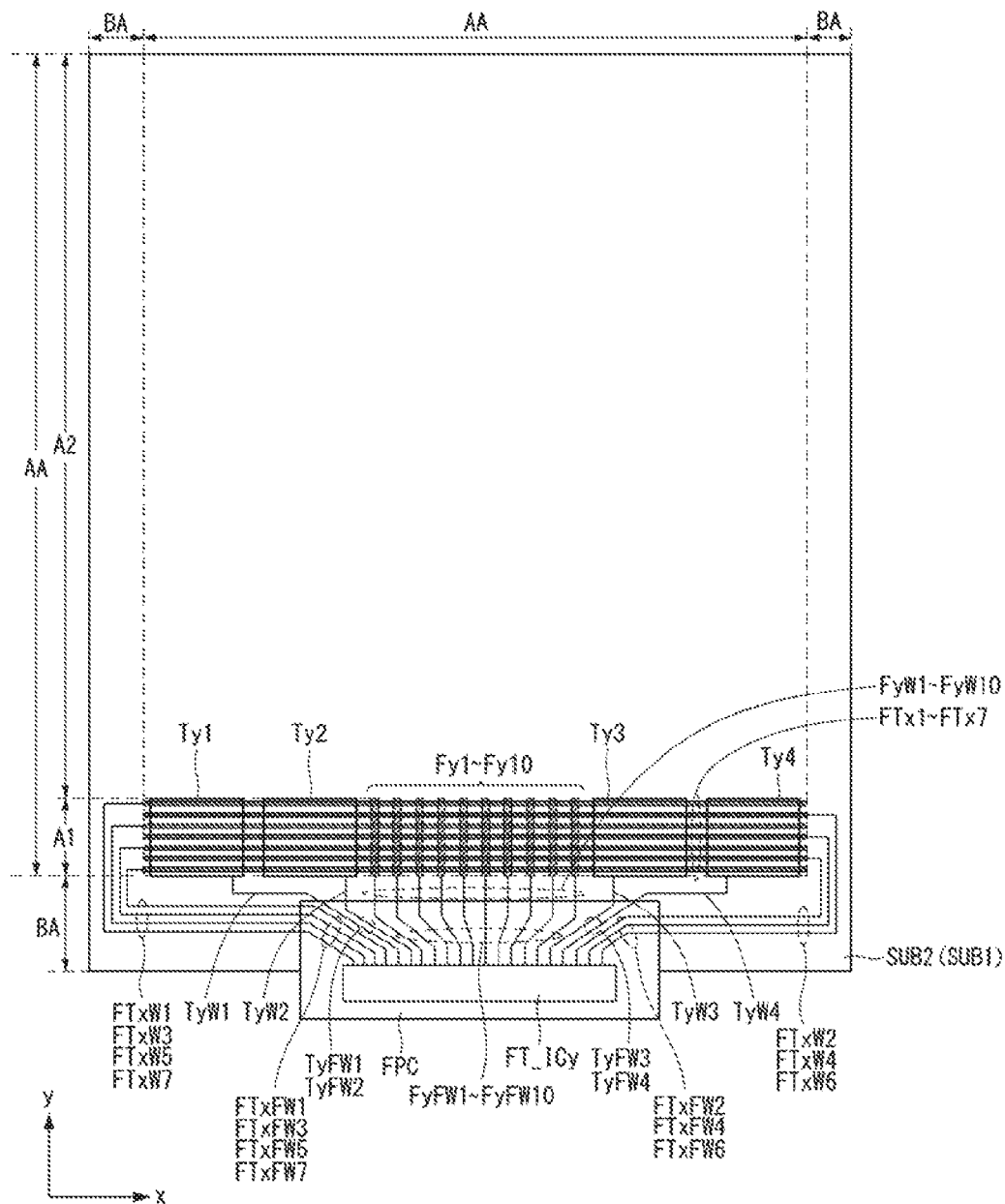
FIG. 7 is a plan view illustrating a sensor screen according to a seventh embodiment of the invention.

Next, a sensor screen according to a seventh embodiment of the invention is described with reference to FIG. 7. FIG. 7 is a plan view illustrating a sensor screen according to the seventh embodiment of the invention.

Referring to FIG. 7, the sensor screen according to the seventh embodiment of the invention is substantially the same as the sensor screen according to the fifth embodiment of the invention, except that first fingerprint electrodes of a fingerprint sensor disposed in a first area of a first active area simultaneously perform a function of a fingerprint electrode and a function of a touch electrode, second fingerprint electrodes are disposed only in a portion of the first area of the first active area, and at least one touch electrode is disposed in a remaining portion of the first area. Therefore, the repeated description is omitted, and only a configuration of the seventh embodiment of the invention different from the fifth embodiment of the invention is described.

In a first area A1 of a first active area AA, a plurality of first fingerprint-touch electrodes FTx1 to FTx7 arranged in a first direction (for example, x-axis direction) and a plurality of second fingerprint electrodes Fy1 to Fy10 arranged in a second direction (for example, y-axis direction) crossing the first direction are disposed. The plurality of second fingerprint electrodes Fy1 to Fy10 are arranged only in a portion of the first area A1, and one or more second touch electrodes Ty1 to Ty4 each having a rectangular shape are disposed in a remaining portion of the first area A1.

The plurality of first fingerprint-touch electrodes FTx1 to FTx7 are arranged in the same manner as the first fingerprint electrodes Fx1 to Fx7 according to the fifth embodiment of the invention. However, the second touch electrodes Ty1 to Ty4 each have the rectangular shape having a width of about 3 mm to 5 mm and may be disposed on both sides of the second fingerprint electrodes Fy1 to Fy10.

In a first bezel area BA, 1-1 fingerprint-touch wires FTxW1, FTxW3, FTxW5, and FTxW7 respectively connected to respective one ends of odd-numbered 1-1 fingerprint-touch electrodes FTx1, FTx3, FTx5, and FTx7 of the plurality of first fingerprint-touch electrodes FTx1 to FTx7, 1-2 fingerprint-touch wires FTxW2, FTxW4, and FTxW6 respectively connected to the other ends of even-numbered 1-2 fingerprint-touch electrodes FTx2, FTx4, and FTx6, a plurality of second fingerprint wires FyW1 to FyW10 respectively connected to the plurality of second fingerprint electrodes Fy1 to Fy10, and second touch wires TyW1 to TyW4 respectively connected to the second touch electrodes Ty1 to Ty4 are disposed.

The seventh embodiment of the invention describes that the 1-1 fingerprint-touch wires FTxW1, FTxW3, FTxW5, and FTxW7 and the 1-2 fingerprint-touch wires FTxW2, FTxW4, and FTxW6 are disposed on both sides of the first bezel area BA and are connected to the one ends of the odd-numbered 1-1 fingerprint-touch electrodes FTx1, FTx3, FTx5, and FTx7 and the other ends of the even-numbered 1-2 fingerprint-touch electrodes FTx2, FTx4, and FTx6, but is not limited thereto. For example, the seventh embodiment of the invention may be configured such that all of the first fingerprint-touch wires FTxW1 to FTxW7 are disposed on one side of the first bezel area BA and are connected to one ends or the other ends of the first fingerprint-touch electrodes FTx1 to FTx7. Alternatively, the seventh embodiment of the invention may be configured such that some (for example, FTxW1 to FTxW4) of the first fingerprint-touch wires FTxW1 to FTxW7 are respectively connected to the one ends of some (for example, FTx1 to FTx4) of the first fingerprint-touch electrodes FTx1 to FTx7, and the remaining first fingerprint-touch wires (for example, FTxW5 to FTxW7) are respectively connected to the other ends of the remaining first fingerprint-touch electrodes (for example, FTx5 to FTx7).

A flexible printed circuit board FPC includes a plurality of 1-1 flexible fingerprint-touch wires FTxFW1, FTxFW3, FTxFW5, and FTxFW7 respectively connected to the 1-1 fingerprint-touch wires FTxW1, FTxW3, FTxW5, and FTxW7, a plurality of 1-2 flexible fingerprint-touch wires FTxFW2, FTxFW4, and FTxFW6 respectively connected to the 1-2 fingerprint-touch wires FTxW2, FTxW4, and FTxW6, a plurality of second flexible touch wires TyFW1 to TyFW4 respectively connected to the second touch wires TyW1 to TyW4, and a plurality of second flexible fingerprint wires FyFW1 to FyFW10 respectively connected to the second fingerprint wires FyW1 to FyW10.

The flexible printed circuit board FPC includes a fingerprint-touch IC FT_IC, to which the 1-1 flexible fingerprint-touch wires FTxFW1, FTxFW3, FTxFW5, and FTxFW7, the 1-2 flexible fingerprint-touch wires FTxFW2, FTxFW4, and FTxFW6, the second flexible touch wires TyFW1 to TyFW4, and the second flexible fingerprint wires FyFW1 to FyFW10 are connected.

The fingerprint-touch IC FT_IC supplies a driving pulse to the first fingerprint-touch electrodes FTx1 to FTx7 or the second fingerprint electrodes Fy1 to Fy10 and the second touch electrodes Ty1 to Ty4, or senses changes in capacitances depending on a touch operation using user's finger through them. Hence, when the touch operation is performed on a formation area of the second touch electrodes Ty1 to Ty4, the fingerprint-touch IC FT_IC can recognize whether or not the touch operation is performed. When the touch operation is performed on a formation area of the second fingerprint electrodes Fy1 to Fy10, the fingerprint-touch IC FT_IC senses changes in capacitances of ridges and valleys of the user's fingerprint in accordance with the touch operation and recognizes the user's fingerprint.

The sensor screen according to the seventh embodiment of the invention forms the touch electrodes in the first area A1 and commonly uses the first fingerprint-touch electrodes in both the fingerprint sensing and the touch sensing. Thus, the sensor screen according to the seventh embodiment of the invention can perform the fingerprint recognition and the touch recognition and can implement a multi-function sensor screen.

Figure 8:
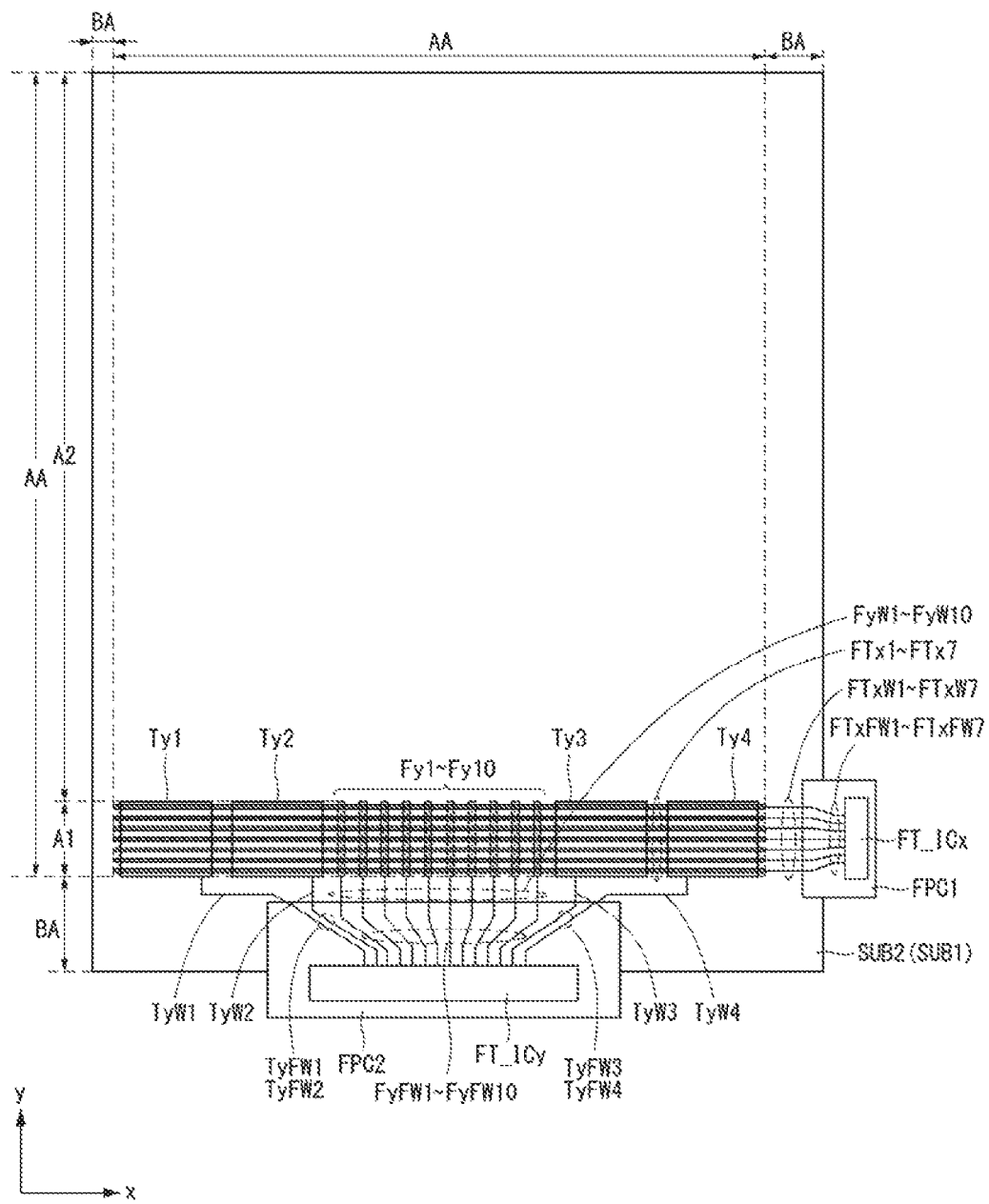
FIG. 8 is a plan view illustrating a sensor screen according to an eighth embodiment of the invention.

Next, a sensor screen according to an eighth embodiment of the invention is described with reference to FIG. 8. FIG. 8 is a plan view illustrating a sensor screen according to the eighth embodiment of the invention.

Referring to FIG. 8, the sensor screen according to the eighth embodiment of the invention is substantially the same as the sensor screen according to the seventh embodiment of the invention, except that a flexible printed circuit board includes a first flexible printed circuit board corresponding to first fingerprint-touch wires and a second flexible printed circuit board corresponding to second fingerprint wires and second touch wires, and an arrangement and a connection relationship of the wires vary depending on the flexible printed circuit board. Therefore, the repeated description is omitted, and only a configuration of the eighth embodiment of the invention different from the seventh embodiment of the invention is described.

In a first bezel area BA, a plurality of first fingerprint-touch wires FTxW1 to FTxW7 respectively connected to respective one ends of a plurality of first fingerprint-touch electrodes FTx1 to FTx7, a plurality of second fingerprint wires FyW1 to FyW10 respectively connected to a plurality of second fingerprint electrodes Fy1 to Fy10, and second touch wires TyW1 to TyW4 respectively connected to one or more second touch electrodes Ty1 to Ty4 are disposed.

First and second flexible printed circuit boards FPC1 and FPC2 are respectively disposed on one side of the first bezel area BA and the other side adjacent to the one side.

The first flexible printed circuit board FPC1 includes a plurality of first flexible fingerprint-touch wires FTxFW1 to FTxFW7 respectively connected to the plurality of first fingerprint-touch wires FTxW1 to FTxW7 and a first fingerprint-touch IC FT_ICx, to which the plurality of first flexible fingerprint-touch wires FTxFW1 to FTxFW7 are connected.

The second flexible printed circuit board FPC2 includes a plurality of second flexible fingerprint wires FyFW1 to FyFW10 respectively connected to the plurality of second fingerprint wires FyW1 to FyW10, a plurality of second flexible touch wires TyFW1 to TyFW4 respectively connected to the second touch wires TyW1 to TyW4, and a second fingerprint-touch IC FT_ICy, to which the wires FyFW1 to FyFW10 and TyFW1 to TyFW4 are connected.

The first fingerprint-touch IC FT_ICx supplies a driving pulse to the first fingerprint-touch electrodes FTx1 to FTx7 and the second touch electrodes Ty1 to Ty4 or senses changes in capacitances depending on a touch operation using user's finger through the electrodes, thereby recognizing the touch operation or the user's fingerprint. When the first fingerprint-touch IC FT_ICx supplies a driving pulse to the first fingerprint-touch electrodes FTx1 to FTx7, the second fingerprint-touch IC FT_ICy senses changes in the capacitances depending on the touch operation using the user's finger through the second fingerprint electrodes Fy1 to Fy10 and the second touch electrodes Ty1 to Ty4, thereby recognizing the touch operation or the user's fingerprint. On the other hand, when the second fingerprint-touch IC FT_ICy supplies the driving pulse to the second fingerprint electrodes Fy1 to Fy10 and the second touch electrodes Ty1 to Ty4, the first fingerprint-touch IC FT_ICx senses changes in the capacitances depending on the touch operation using the user's finger through the first fingerprint-touch electrodes FTx1 to FTx7, thereby recognizing the touch operation or the user's fingerprint.

Because the sensor screen according to the eighth embodiment of the invention dividedly performs the fingerprint-touch drive and the fingerprint-touch sensing using the first and second fingerprint-touch ICs FT_ICx and FT_ICy respectively disposed on the first and second flexible printed circuit boards FPC1 and FPC2, the eighth embodiment of the invention can simplify the wiring structure and can clarify a drive relationship, in addition to the effect capable of being obtained from the sensor screen according to the seventh embodiment of the invention.

Figure 9:
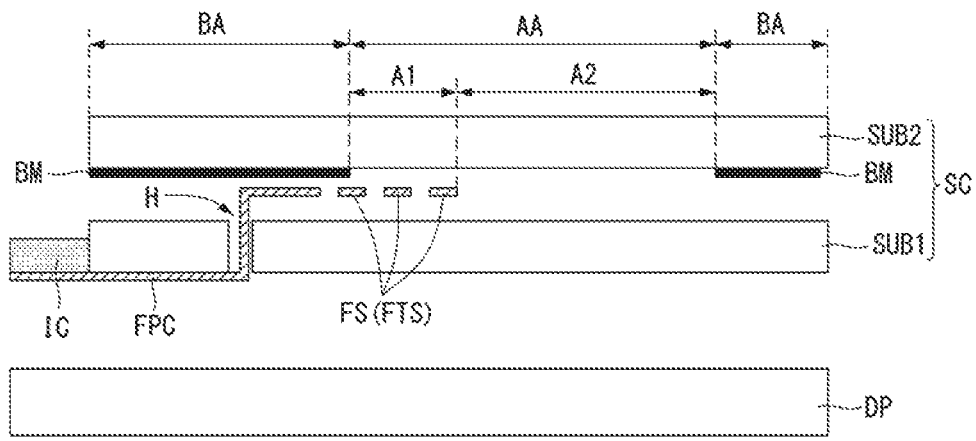
FIG. 9 is a cross-sectional view schematically illustrating an example where the sensor screen according to at least one of the first to eighth embodiments of the invention is coupled with a display panel.
Figure 10:
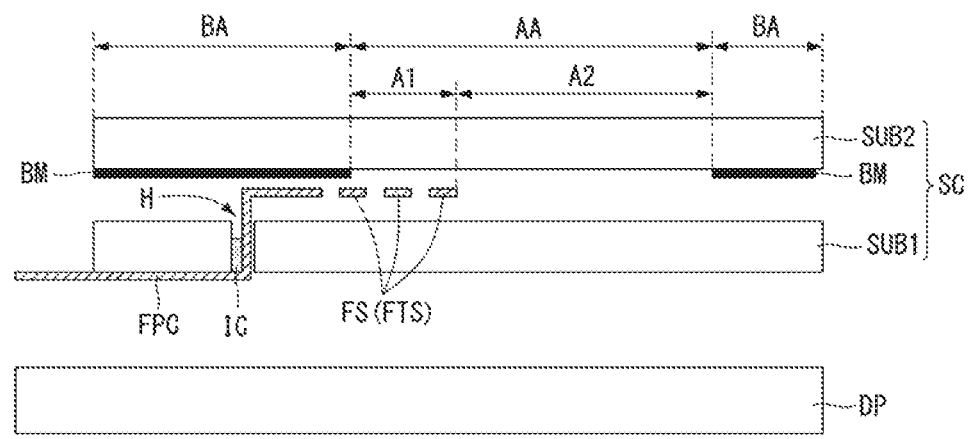
FIG. 10 is a cross-sectional view schematically illustrating another example where the sensor screen according to at least one of the first to eighth embodiments of the invention is coupled with a display panel.

Next, an example of a display device, in which the sensor screens according to the first to eighth embodiments of the invention are applied to a display panel, is described with reference to FIGS. 9 and 10. FIG. 9 is a cross-sectional view schematically illustrating an example where the sensor screen according to the first to eighth embodiments of the invention is coupled with a display panel. FIG. 10 is a cross-sectional view schematically illustrating another example where the sensor screen according to the first to eighth embodiments of the invention is coupled with a display panel. All the components of the display panel of FIGS. 9 and 10 are operatively coupled and configured.

Referring to FIG. 9, a sensor screen SC according to the first to eighth embodiments of the invention may be disposed on a display panel DP of a display device. The display panel DP may use a panel of a flat panel display, such as a liquid crystal display (LCD), an organic light emitting diode (OLED) display, a field emission display (FED), and a plasma display panel (PDP).

Each of first and second base members SUB1 and SUB2 of the sensor screen SC includes a first active area AA and a first bezel area BA. The first active area AA of the sensor screen SC corresponds to a second active area AA of the display panel DP, on which an image is displayed. The first bezel area BA of the sensor screen SC corresponds to a second bezel area BA of the display panel DP disposed outside the second active area AA.

The first base member SUB1 of the sensor screen SC includes at least one hole H disposed in the first bezel area BA. Flexible printed circuit boards FPC, FPC1, and FPC2 extend from an upper surface to a lower surface of the first base member SUB1 through the hole H. In an example of FIG. 9, fingerprint ICs IC, IC1, IC2, IC3, ICx, ICy, ICy1, ICy2, and ICy3 and fingerprint-touch ICs FT_IC, FT_ICx, and FT_ICy disposed on the flexible printed circuit boards FPC, FPC1, and FPC2 may be disposed outside the first base member SUB1.

When the fingerprint ICs IC, IC1, IC2, IC3, ICx, ICy, ICy1, ICy2, and ICy3 and the fingerprint-touch ICs FT_IC, FT_ICx, and FT_ICy are disposed outside the first base member SUB1 as described above, the fingerprint ICs and the fingerprint-touch ICs can be prevented from being damaged due to a pressure applied by the first base member SUB1 when the fingerprint ICs and the fingerprint-touch ICs are disposed between the first and second base members SUB1 and SUB2.

The sensor screen SC includes a fingerprint sensor FS or a fingerprint-touch sensor FTS disposed in the first active area AA of one surface of one of the first and second base members SUB1 and SUB2 which are positioned opposite each other. The first and second base members SUB1 and SUB2 may be attached to each other using a transparent material having an excellent adhesive strength and excellent weatherability, for example, an optical clear adhesive (OCA) or an optical clear resin (OCR). Further, the first and second base members SUB1 and SUB2 may be attached to the display panel DP using the OCA or the OCR.

The second base member SUB2 may include a black matrix BM, which is disposed in the first bezel area BA at the lower surface of the second base member SUB2 and surrounds the first active area AA, so as to prevent a loss of a transmittance when the second base member SUB2 is attached to the display panel DP.

Referring to FIG. 10, a sensor screen SC according to the first to eighth embodiments of the invention may be disposed on a display panel DP of a display device. The display device of FIG. 10 is substantially the same as the display device of FIG. 9, except that fingerprint ICs IC, IC1, IC2, IC3, ICx, ICy, ICy1, ICy2, and ICy3 and fingerprint-touch ICs FT_IC, FT_ICx, and FT_ICy are disposed inside a hole H of a first base member SUB1. Thus, only a difference between the display device of FIG. 10 and the display device of FIG. 9 is described below.

In the display device of FIG. 10, the first base member SUB1 of the sensor screen SC includes at least one hole H disposed in a first bezel area BA. Flexible printed circuit boards FPC, FPC1, and FPC2 extend from an upper surface to a lower surface of the first base member SUB1 through the hole H. The fingerprint ICs IC, IC1, IC2, IC3, ICx, ICy, ICy1, ICy2, and ICy3 and the fingerprint-touch ICs FT_IC, FT_ICx, and FT_ICy disposed on the flexible printed circuit boards FPC, FPC1, and FPC2 are disposed inside the hole H of the first base member SUB1.

When the fingerprint ICs IC, IC1, IC2, IC3, ICx, ICy, ICy1, ICy2, and ICy3 and the fingerprint-touch ICs FT_IC, FT_ICx, and FT_ICy are disposed inside the hole H, the fingerprint electrodes are positioned close to the fingerprint IC, and the fingerprint-touch electrodes are positioned close to the fingerprint-touch IC. Thus, the display device of FIG. 10 can reduce a noise resulting from flexible wires disposed on the flexible printed circuit board and can increase the sensitivity of the fingerprint recognition or the sensitivity of the touch recognition.

Although embodiments have been described with reference to a number of illustrative embodiments thereof, it should be understood that numerous other modifications and embodiments can be devised by those skilled in the art that will fall within the scope of the principles of this disclosure. For example, in the embodiments of the invention, the fingerprint electrodes, the touch electrodes, the fingerprint IC, the fingerprint-touch IC, the flexible printed circuit board, and the various wires may be variously changed in number. Thus, various variations and modifications are possible in the component parts and/or arrangements of the subject combination arrangement within the scope of the disclosure, the drawings and the appended claims.

What is claimed is:
1. A sensor screen comprising:
   a first base member including a first active area having a first area and a second area, and a first bezel area outside the first active area, the first base member having a first thickness;

a second base member positioned opposite the first base member, the second base member having a second thickness less than the first thickness; and a fingerprint sensor disposed in the first area on one of the first and second base members which are positioned opposite each other, the fingerprint sensor including a first group of fingerprint electrodes, which are arranged in a first direction in a portion of the first active area, and a second group of fingerprint electrodes, which are insulated from the first group of fingerprint electrodes and are arranged in a second direction crossing the first direction.

2. The sensor screen of claim 1, further comprising a flexible printed circuit board having a fingerprint integrated circuit (IC) mounted thereon, the fingerprint IC being configured to supply a driving pulse to one group among the first and second groups of fingerprint electrodes and sense a voltage difference resulting from a touch operation through another group among the first and second groups of fingerprint electrodes.

3. The sensor screen of claim 2, wherein the fingerprint sensor is entirely disposed in a portion having a predetermined width in the first active area, wherein the flexible printed circuit board is a single flexible printed circuit board on which a plurality of fingerprint ICs are mounted, wherein the first group of fingerprint electrodes are commonly connected to each of the plurality of fingerprint ICs through first wires, and wherein the second group of fingerprint electrodes are divided into a same number of sub-groups as a number of the plurality of fingerprint ICs, and the sub-groups of fingerprint electrodes are respectively connected to the plurality of fingerprint ICs through second wires.

4. The sensor screen of claim 2, wherein the fingerprint sensor is entirely disposed in a portion having a predetermined width in the first active area, wherein the flexible printed circuit board is a single flexible printed circuit board on which a single fingerprint IC is mounted, wherein the first group of fingerprint electrodes are respectively connected to the single fingerprint IC through first wires, and wherein the second group of fingerprint electrodes are connected to the single fingerprint IC through jumping wires, each of which connects a predetermined number of second wires among second wires respectively connected to the second group of fingerprint electrodes.

5. The sensor screen of claim 2, wherein the fingerprint sensor is entirely disposed in a portion having a predetermined width in the first active area, wherein the flexible printed circuit board includes a first flexible printed circuit board on which first fingerprint IC is mounted and a second flexible printed circuit board on which a plurality of second fingerprint ICs are mounted, wherein the first group of fingerprint electrodes are connected to the first fingerprint IC through first wires, and wherein the second group of fingerprint electrodes are divided into a same number of sub-groups as a number of the plurality of second fingerprint ICs, and the sub-groups of fingerprint electrodes are respectively connected to the plurality of second fingerprint ICs.

6. The sensor screen of claim 2, wherein the fingerprint sensor is entirely disposed in a portion having a predetermined width in the first active area, wherein the flexible printed circuit board includes a first flexible printed circuit board on which a first fingerprint IC is mounted and a second flexible printed circuit board on which a second fingerprint IC is mounted, wherein the first group of fingerprint electrodes are connected to the fingerprint IC through first wires, wherein the second group of fingerprint electrodes are connected to the second fingerprint IC through jumping wires, each of which connects a predetermined number of second wires among second wires respectively connected to the second group of fingerprint electrodes.

7. The sensor screen of claim 2, wherein the first group of fingerprint electrodes of the fingerprint sensor are entirely disposed in a portion having a predetermined width in the first active area, and the second group of fingerprint electrodes of the fingerprint sensor are partially disposed in a portion having a predetermined width in the first active area, and wherein the flexible printed circuit board is a single flexible printed circuit board on which a single fingerprint IC is mounted, wherein the first group of fingerprint electrodes are connected to the single fingerprint IC through first wires, and wherein the second group of fingerprint electrodes are connected to the single fingerprint IC through second wires.

8. The sensor screen of claim 2, wherein the first group of fingerprint electrodes of the fingerprint sensor are entirely disposed in a portion having a predetermined width in the first active area, and the second group of fingerprint electrodes of the fingerprint sensor are partially disposed in a portion having a predetermined width in the first active area, and wherein the flexible printed circuit board includes a first flexible printed circuit board on which a first fingerprint IC is mounted, and a second flexible printed circuit board on which a second fingerprint IC is mounted, wherein the first group of fingerprint electrodes are connected to the first finger print IC through first wires, and the second group of fingerprint electrodes are connected to the second finger print IC through second wires.

9. The sensor screen of claim 2, wherein the first group of fingerprint electrodes of the fingerprint sensor serve as first touch electrodes and are entirely disposed in a portion having a predetermined width in the first active area, the second group of fingerprint electrodes of the fingerprint sensor are partially disposed in a portion having a predetermined width in the first active area, and at least one second touch electrode is disposed in a remaining area of the portion having the predetermined width, wherein the flexible printed circuit board is a single flexible printed circuit board on which a single fingerprint-touch IC is mounted, and wherein the single fingerprint-touch IC is connected to the first group of fingerprint electrodes through first wires, is connected to the second group of fingerprint electrodes through second wires, and is connected to the at least one second touch electrode through third wires.

10. The sensor screen of claim 2, wherein the first group of fingerprint electrodes of the fingerprint sensor serve as first touch electrodes and are entirely disposed in a portion having a predetermined width in the first active area, the second group of fingerprint electrodes of the fingerprint sensor are partially disposed in a portion having a predetermined width in the first active area, and at least one second touch electrode is disposed in a remaining area of the portion having the predetermined width, and wherein the flexible printed circuit board includes a first flexible printed circuit board on which a first fingerprint IC is mounted, and a second flexible printed circuit board on which a second fingerprint IC is mounted, and wherein the first group of fingerprint electrodes are connected to the first fingerprint IC, wherein the second group of fingerprint electrodes are connected to the second fingerprint IC through second wires, and the at least one second touch electrode are connected to the second fingerprint IC through third wires.

11. The sensor screen of claim 2, wherein the flexible printed circuit board extends toward the outside of a back surface of the first base member through a hole formed in the first bezel area of the first base member, and wherein the fingerprint IC is positioned adjacent to one end of the first base member.

12. The sensor screen of claim 2, wherein the flexible printed circuit board extends toward the outside of a back surface of the first base member through a hole formed in the first bezel area of the first base member, and wherein the fingerprint IC is positioned inside the hole.

13. A display device comprising:

a display panel including a second active area in which an image is displayed, and a second bezel area disposed outside the second active area; and a sensor screen disposed on the display panel, the sensor screen including:

a first base member including a first active area having first and second areas corresponding to the second active area, and a first bezel area outside the first active area, the first base member having a first thickness;

a second base member positioned opposite the first base member, the second base member having a second thickness less than the first thickness; and a fingerprint sensor disposed in the first area on one of the first and second base members which are positioned opposite each other, the fingerprint sensor including a first group of fingerprint electrodes, which are arranged in a first direction in a portion of the first active area, and a second group of fingerprint electrodes, which are insulated from the first group of fingerprint electrodes and are arranged in a second direction crossing the first direction.

14. A sensor screen comprising:

a first base member including a first active area and a first bezel area, and having a first thickness;

a second base member positioned opposite the first base member, the second base member having a second thickness less than the first thickness;

a fingerprint sensor disposed on one of the first and second base members which are positioned opposite each other, the fingerprint sensor including a first group of fingerprint electrodes, which are arranged in a first direction in a portion of the first active area, and a second group of fingerprint electrodes, which are insulated from the first group of fingerprint electrodes and are arranged in a second direction crossing the first direction; and a flexible printed circuit board having a fingerprint integrated circuit (IC) mounted thereon, the fingerprint IC being configured to supply a driving pulse to one group among the first and second groups of fingerprint electrodes and sense a voltage difference resulting from a touch operation through another group among the first and second groups of fingerprint electrodes.

* * * * *